United States Patent [19]
Oike et al.

[11] Patent Number: 5,829,394
[45] Date of Patent: Nov. 3, 1998

[54] EXHAUST CONTROLLER FOR SPARK IGNITION TYPE TWO STROKE INTERNAL COMBUSTION ENGINE

[75] Inventors: Ikuo Oike; Toshikazu Hiasa, both of Saitama, Japan

[73] Assignee: Honda Giken Kogyo Kabushiki Kaisha, Tokyo, Japan

[21] Appl. No.: 887,227

[22] Filed: Jul. 2, 1997

[30]     Foreign Application Priority Data

Jul. 2, 1996  [JP]  Japan ..................................... 8-172519

[51] Int. Cl.⁶ ............................. F02D 13/02; F02B 25/20; F02B 9/00; F02B 11/00
[52] U.S. Cl. ....................................................... 123/65 PE
[58] Field of Search ................................. 123/65 PE, 65 P

[56]                 References Cited

FOREIGN PATENT DOCUMENTS

A 7-71279   3/1995   Japan .

*Primary Examiner*—Marguerite McMahon
*Attorney, Agent, or Firm*—Birch, Stewart, Kolasch and Birch, LLP

[57]                 ABSTRACT

An exhaust controller for a spark ignition type two stroke internal combustion engine capable of adjusting an exhaust timing by an exhaust control valve, characterized by sufficiently cooling an outer peripheral wall of an exhaust passage. In a spark ignition type two stroke internal combustion engine, a cylinder head side outer peripheral portion of an upstream portion of an exhaust passage smoothly connected to an exhaust port is formed of an exhaust passage forming portion of a lid member closing an exhaust control valve. A crank case side outer peripheral portion of the exhaust passage is formed of a cylinder block. The cylinder head side outer peripheral portion of the exhaust passage is cooled by a cooling water passage near a cylinder head which is formed in the lid member and the crank case side outer peripheral portion of the exhaust passage is directly cooled by a cylinder block cooling water passage near a crank case which is formed in the cylinder block.

21 Claims, 18 Drawing Sheets

EXHAUST CONTROLLER FOR SPARK IGNITION TYPE TWO STROKE INTERNAL COMBUSTION ENGINE

BACKGROUND OF THE INVENTION

1. Field of the Invention

The present invention relates to an exhaust controller of a spark ignition type two stroke internal combustion engine capable of adjusting an exhaust timing by an exhaust control valve, wherein an outer peripheral wall of an exhaust passage is sufficiently cooled.

2. Description of Background Art

Spark ignition type two stroke internal combustion engines of this kind have been known, for example, from Japanese Patent Laid-open No. Hei 7-71279. This engine includes an exhaust port and a scavenging port opened/closed by the reciprocating motion of a piston. The ports are opened to communicate with a cylinder hole. An exhaust passage and a scavenging passage are respectively communicated to the exhaust port and the scavenging port. New gas (unburnt gas) pre-compressed in a crank chamber is fed to the cylinder hole through the scavenging passage and a scavenging port, being compressed in the cylinder hole, and ignited by an ignition plug, and the burnt gas is exhausted into the exhaust passage from the exhaust port. An exhaust control valve is provided in the exhaust port for reducing the blowoff of the new gas upon scavenging for blocking an upper portion of the exhaust port by the exhaust control valve in a low speed rotational state of the engine, and for opening the exhaust port in a high speed rotational state of the engine.

The configuration of the internal combustion engine described in Japanese Patent Laid-open No. Hei 7-71279 will be more fully described below with reference to FIGS. 30 and 31, wherein exhaust passages 03, 04, communicate with a cylinder hole 01 via an exhaust port 02. The exhaust passages 03, 04 are respectively formed in an exhaust passage member 07 holding an exhaust control valve 05 in co-operation with a cylinder block 06 and in a lid member 08 closing the exhaust control valve 05 and the exhaust passage member 07. Cooling water passages 09, 010 are respectively formed in the exhaust passage member 07 and the lid member 08 at positions over the exhaust passages 03, 04. Both the cooling water passages 09, 010 are in communication with each other. The cooling water passage 010 of the lid member 08 is communicated to a cooling water passage 011 of the cylinder block 06. Thus, part of the cooling water supplied to the cooling water passage 011 of the cylinder block 06 by a cooling water pump (not shown) flows through the cooling water passages 010, 09 of the lid member 08 and the exhaust passage member 07 to cool upper portions of the exhaust passage member 07 and the lid member 08.

In a general two stroke internal combustion engine, an exhaust passage is inclined on the crank case side and a crank case side outer peripheral portion of the exhaust passage is narrow. Accordingly, in the above-described internal combustion engine, a lower portion of the exhaust passage member 07 and a lower portion of the lid member 08 which are respectively positioned under the exhaust passages 03, 04 become thin, with a result that any cooling water passages do not exist in these lower portions. The lower portion of the exhaust passage member 07 is indirectly cooled by the cooling water passage 011 of the cylinder block 06. This causes an inconvenience wherein the lower portion of the exhaust passage member 07, which is brought into contact with the exhaust passage 03 over a relatively wide range, tends to be heated at a high temperature.

SUMMARY OF THE INVENTION

The present invention is intended to provide an improved spark ignition type two stroke internal combustion engine for solving in the above problems. The present invention includes a configuration wherein an exhaust controller for a spark ignition type two stroke internal combustion engine includes an exhaust passage opened in a cylinder hole via an exhaust port, and an exhaust control valve held in such a manner as to be reciprocatively movable along the exhaust port in the center line direction of the cylinder hole for blocking at least a cylinder head side portion of the exhaust port. A cylinder head side outer peripheral portion of an upstream portion of the exhaust passage is smoothly connected to the exhaust port and is formed of a lid member closing the exhaust control valve or an exhaust passage member additionally provided on the lid member and the exhaust control valve. A crank case side outer peripheral portion of the exhaust passage is formed of a cylinder block. The cylinder head side outer peripheral portion of the exhaust passage is cooled by a cooling water passage near a cylinder head, the cooling water passage being formed in the lid member or the exhaust passage member additionally provided on the lid member, and the crank case side outer peripheral portion of the exhaust passage is directly cooled by a cylinder block cooling water passage near a crank case, the cylinder block cooling water passage being formed in the cylinder block.

With this configuration, even for a two stroke internal combustion engine in which an exhaust passage is inclined on the crank case side and a crank case side outer peripheral portion of the exhaust passage is narrow, a lid member closing an exhaust control valve or an exhaust passage member additionally provided on the lid member does not exist in such a portion, and the crank case side outer peripheral portion of the exhaust passage is formed of a cylinder block and is directly cooled by a cylinder block cooling water passage near a crank case which is formed in the cylinder block while a cylinder head side outer peripheral portion of the exhaust passage is cooled by a cooling water passage near a cylinder head which is formed in the lid member or in the exhaust passage member additionally provided in the lid member, whereby the outer peripheral portion of the exhaust passage can be substantially uniformly, sufficiently cooled over a wide range.

According to the present invention, the cylinder block cooling water passage near the crank case is communicated to the cooling water passage near the cylinder head which is formed in the lid member only by bringing the lid member into contact with the cylinder block and integrally connecting them to each other, to thereby simply form a cooling water system.

According to the present invention, a control surface of a leading end of the exhaust control valve can be smoothly, easily moved in the vertical direction.

According to the present invention, in the case where the cylinder hole is provided upright, the dead weight of the lid member can be stably, firmly supported on the exhaust passage forming portion of the cylinder block.

According to the present invention, the exhaust controller can be assembled in the two stroke internal combustion engine by rockably mounting the exhaust control valve on the lid member and then mounting the lid member on the cylinder block, so that it becomes possible to support the exhaust control valve in such a manner as to be stably and reliably rockable, and to improve an assembling efficiency of the two stroke internal combustion engine with reduced cost.

According to the present invention, an exhaust gas can be made to smoothly flow out of the exhaust port without any disturbance in a state in which the exhaust control valve is opened, so that it becomes possible to enhance the charging efficiency and hence to improve the output and the efficiency of the engine.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

PREFERRED EMBODIMENTS OF THE INVENTION

Figure 1:
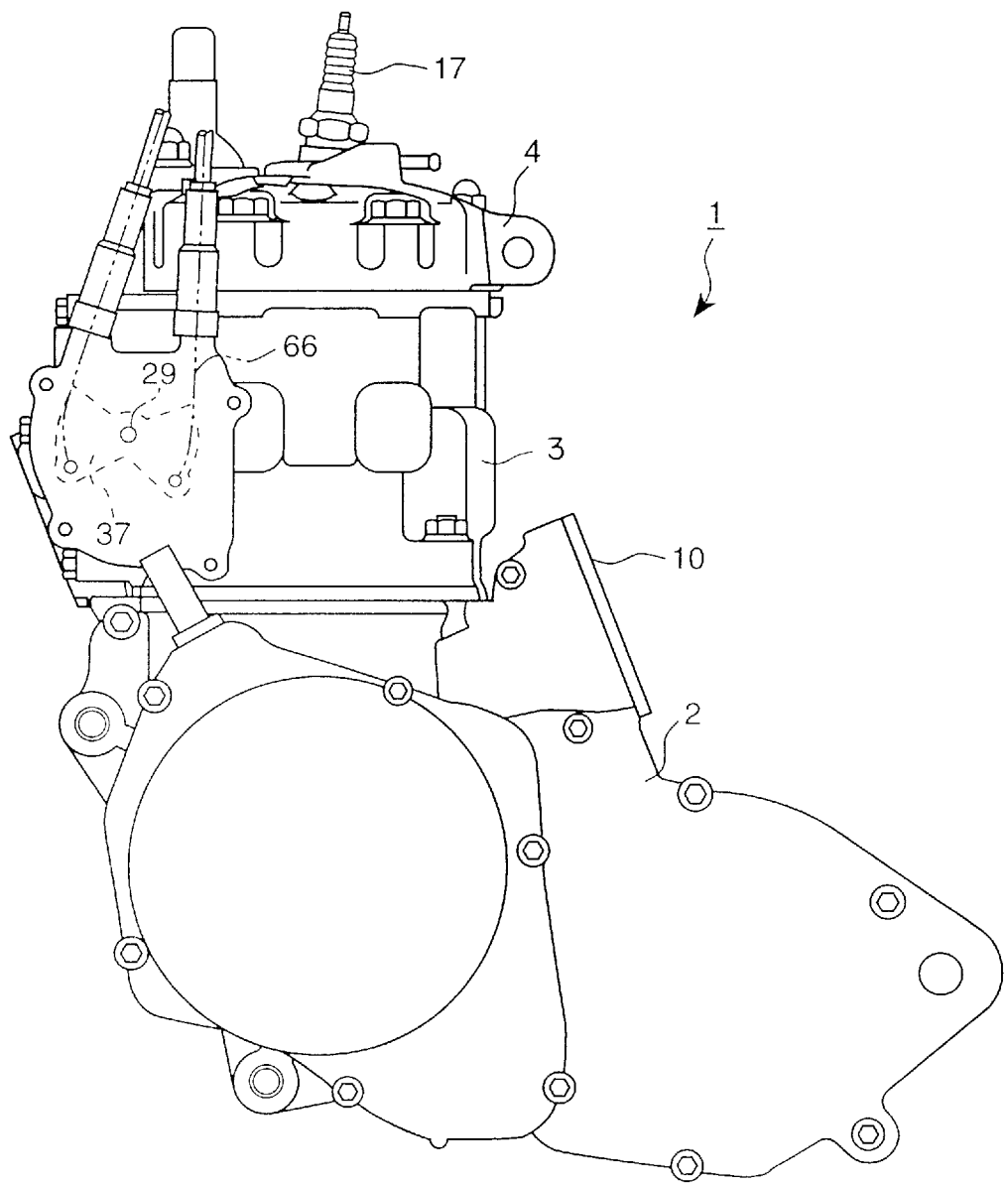
FIG. 1 is a side view of a spark ignition type two stroke internal combustion engine including an exhaust controller of the present invention.
Figure 2:
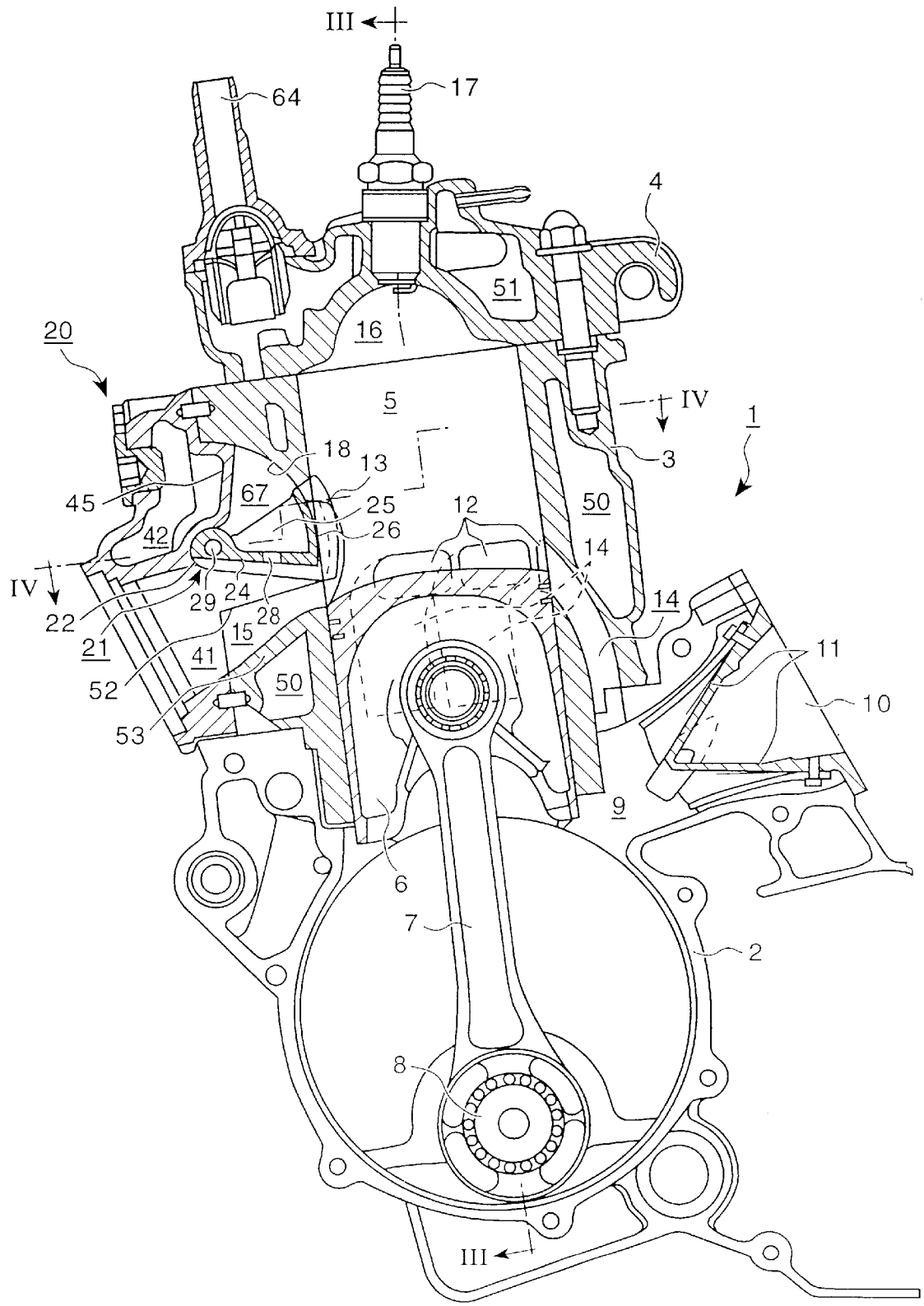
FIG. 2 is a vertical sectional side view of FIG. 1 showing a state in which an exhaust control valve is rocked downwardly.

Hereinafter, a preferred embodiment of the present invention will be described with reference to the drawings. One embodiment of the present invention will be described below with reference to FIGS. 1 to 23.

A spark ignition type two stroke internal combustion engine 1 including an exhaust control valve of the present invention is a single cylinder internal combustion (or multi-cylinder internal combustion engine) in which a cylinder block 3 is mounted on a motorcycle (not shown) in a posture raised upwardly. In the engine 1, the cylinder block 3 and a cylinder head 4 are sequentially stacked over a crank case 2 and are integrally connected to each other.

A piston 6 is vertically slidably fitted in a cylinder hole 5 formed in the cylinder block 3, and the piston 6 is connected to a crank shaft 8 by a connecting rod 7. The crank shaft 8 is rotated by vertical movement of the piston 6.

An intake passage 10 communicates with a crank chamber 9 of the crank case 2 and is formed in the crank case 2 at a position behind the cylinder block 3. A reed valve 11 is interposed in the intake passage 10, and a carburetor (not shown) is interposed in the intake passage 10 on the upstream side from the reed valve 11. Scavenging ports 12 are opened in an inner peripheral surface of the cylinder hole 5, and an exhaust port 13 is opened in the inner peripheral surface of the cylinder hole 5 over the scavenging ports 12 at a position opposed to the intake passage 10. The scavenging ports 12 are communicated to the crank chamber 9 via scavenging passages 14 formed in the cylinder block 3. The exhaust port 13 communicates with an exhaust passage 15 formed in the cylinder block 3, and the exhaust passage 15 is opened to the front side of the body.

An ignition plug 17 is provided in a recessed portion of a combustion chamber 16 over the cylinder hole 5. Fresh air mixed with fuel by the carburetor (not shown) is sucked via the reed valve 11 into the crank chamber 9 when the pressure of the crank chamber 9 becomes negative at the up-stroke, and is compressed at the down-stroke. The compressed new gas is supplied into the combustion chamber 16 via the scavenging passages 14 when the scavenging ports 12 are opened by downward movement of the piston 6. By such an advance of the compressed new gas, part of the burnt gas in the combustion chamber 16 is exhausted into the exhaust passage 15 from the exhaust port 13. When the scavenging ports 12 and the exhaust port 13 are sequentially blocked by upward movement of the piston 6, the gas mixture in the combustion chamber 16 is compressed by upward movement of the piston 6, and then ignited by the ignition plug 17 near the top dead center.

A containing recessed portion 18, which is formed substantially in a fan shape in a side view, is formed in an upper portion of the exhaust passage 15 at a position near the exhaust port 13 in the cylinder block 3, and it is covered with a lid member 20 including an exhaust passage 41 continuous to the downstream side of the exhaust passage 15 of the cylinder block 3.

Figure 21:
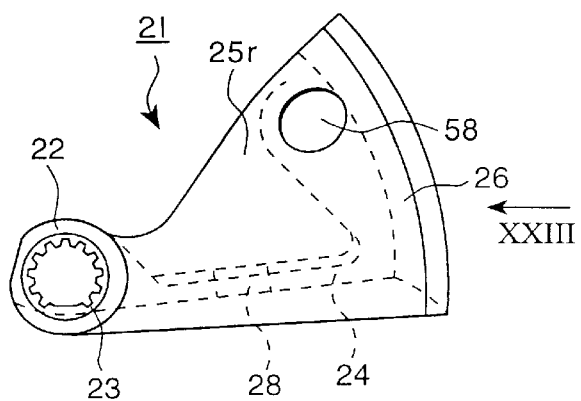
FIG. 21 is a side view of FIG. 20.
Figure 22:
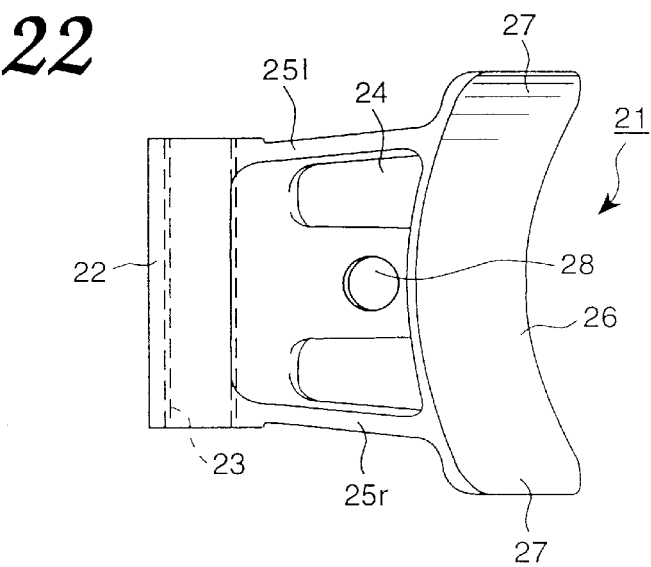
FIG. 22 is a plan view of FIG. 20.
Figure 23:
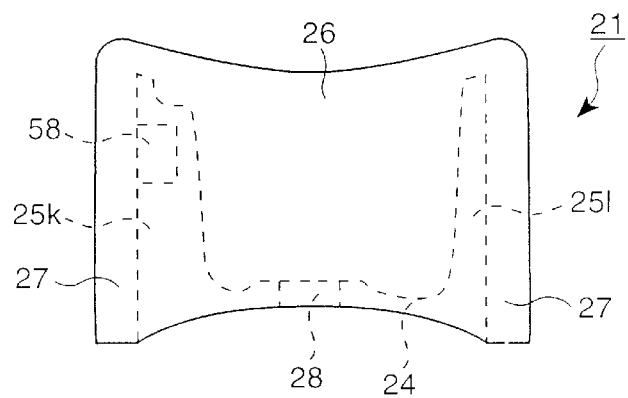
FIG. 23 is a view seen taken in the direction of arrow XXIII of FIG. 21.
Figure 24:
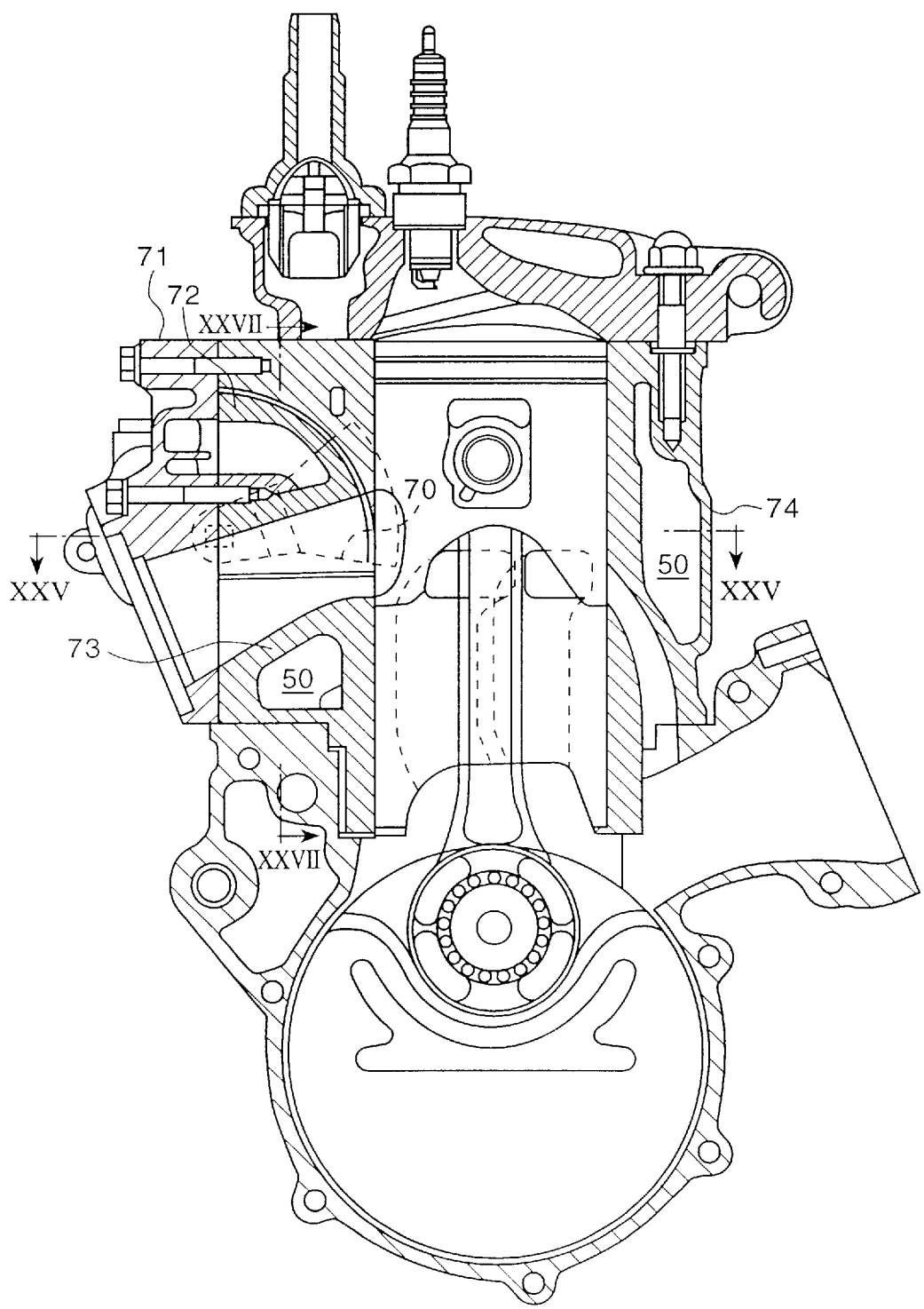
FIG. 24 is a vertical sectional side view showing another embodiment.
Figure 25:
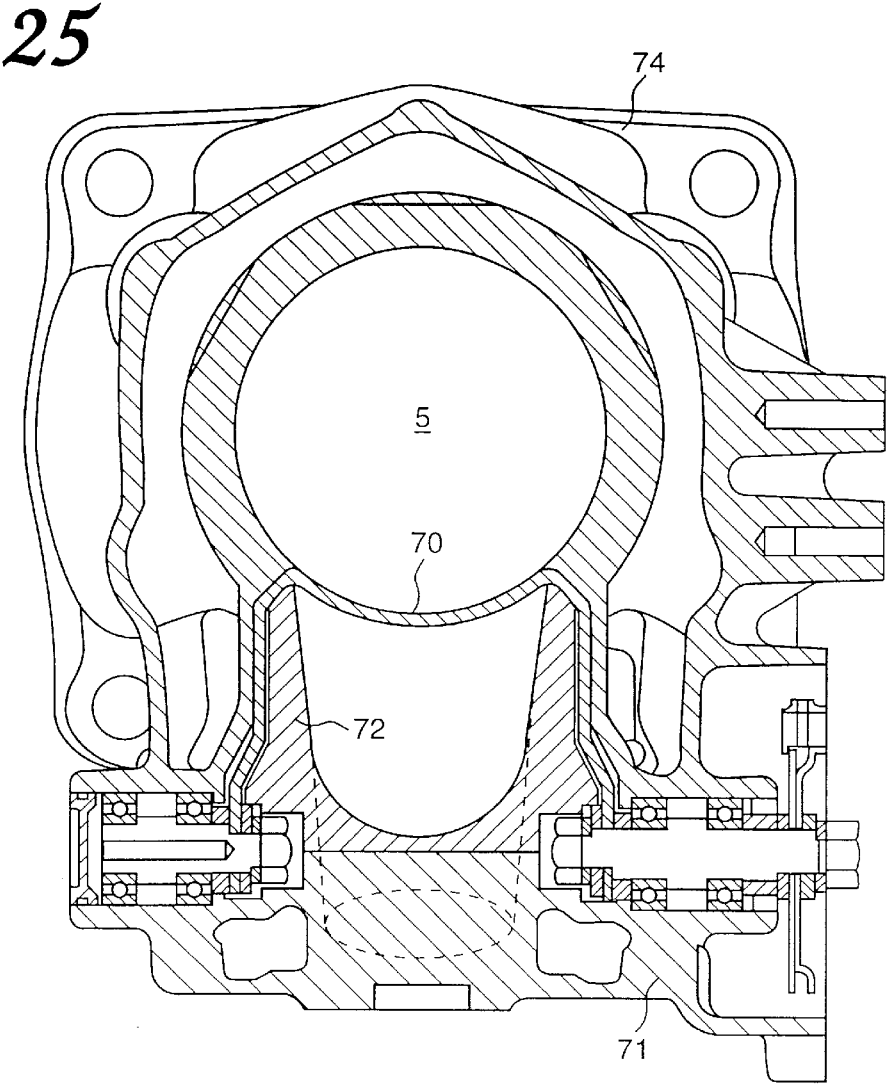
FIG. 25 is a transverse sectional plan view taken on line XXV—XXV of FIG. 24.
Figure 26:
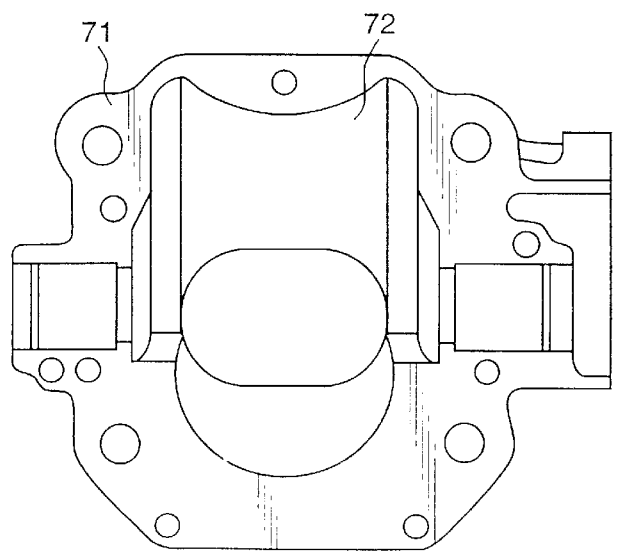
FIG. 26 is a front view of a lid member and an exhaust passage member shown in FIG. 24.
Figure 27:
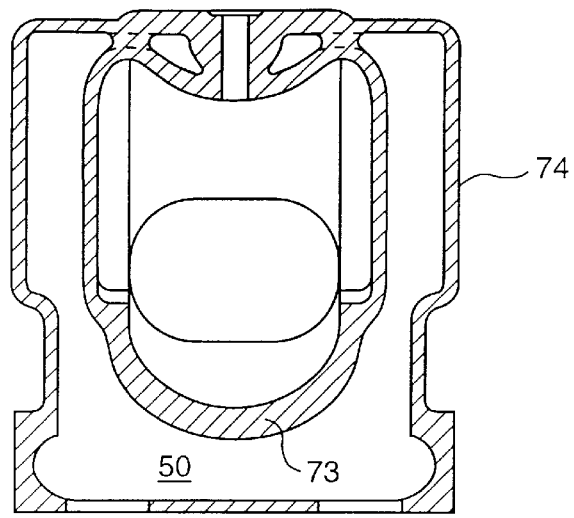
FIG. 27 is a vertical sectional view taken along line XXVII—XXVII of FIG. 24.

As shown in FIGS. 21 to 23, an exhaust control valve 21 is disposed in the containing recessed portion 18. The exhaust control valve 21 is formed substantially in a fan shape in a side view. A rotatably supporting portion 22 is formed at the center of the fan shape of the exhaust control valve 21, and a spline hole 23 is formed in the rotatably supporting portion 22. A bottom wall 24 includes a leading edge whose curvature is substantially identical to that of an upper edge of the cylinder hole 5 in a side view and is formed on a bottom surface of the exhaust control valve 21. A side wall 25 is erected upright from each side edge of the bottom wall 24. A control wall 26, having an arcuate surface, is erected to extend upwardly from the leading edge of the bottom wall 24. A projecting portion 27 projects sidewardly from the side walls 25l and 25r along the peripheral surface of the cylinder hole 5. The projecting portion 27 is formed on each side of the control wall 26. A communication hole 28 is provided substantially at the center of the bottom wall 24.

Figure 4:
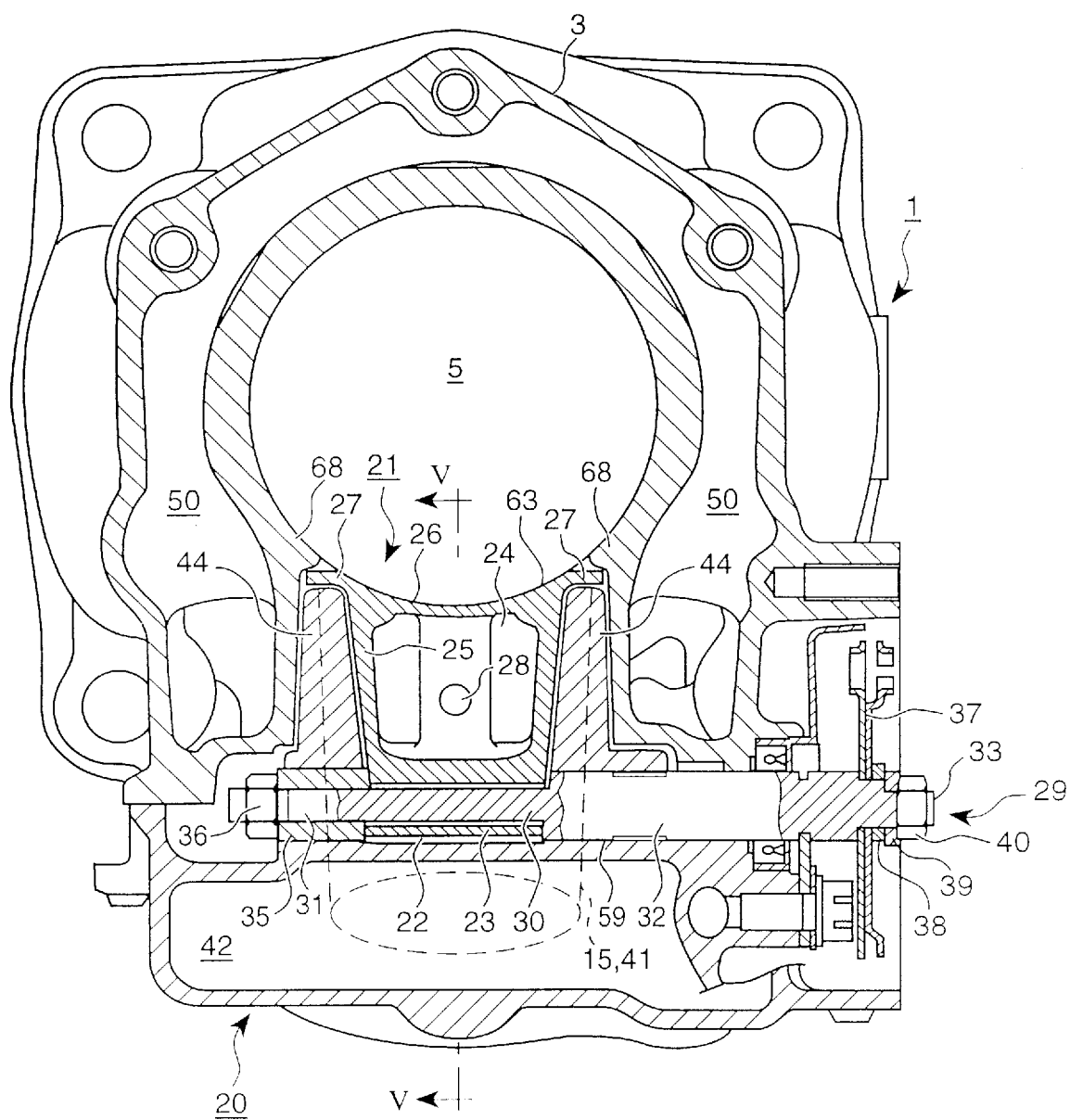
FIG. 4 is a transverse sectional plan view taken on line IV—IV of FIG. 2.

As shown in FIG. 4, a spline portion 30 of a valve driving shaft 29 is fitted in the spline hole 23 of the exhaust control valve 21, and a collar 35 is fitted around a small diameter portion 31 positioned near the leading end from the spline portion 30. A nut 36 is screwed on a leading end of the small diameter portion 31. Thus, the exhaust control valve 21 is connected integrally with the valve driving shaft 29.

A base portion 32 of the valve driving shaft 29 has an outside diameter identical to that of the collar 35. A pulley 37, a collar 38, and a washer 39 are sequentially fitted around a small diameter portion 33 at a base end of the base portion 32. A nut 40 is screwed on a threaded portion 34 near the base end of the small diameter portion 33.

Figure 11:
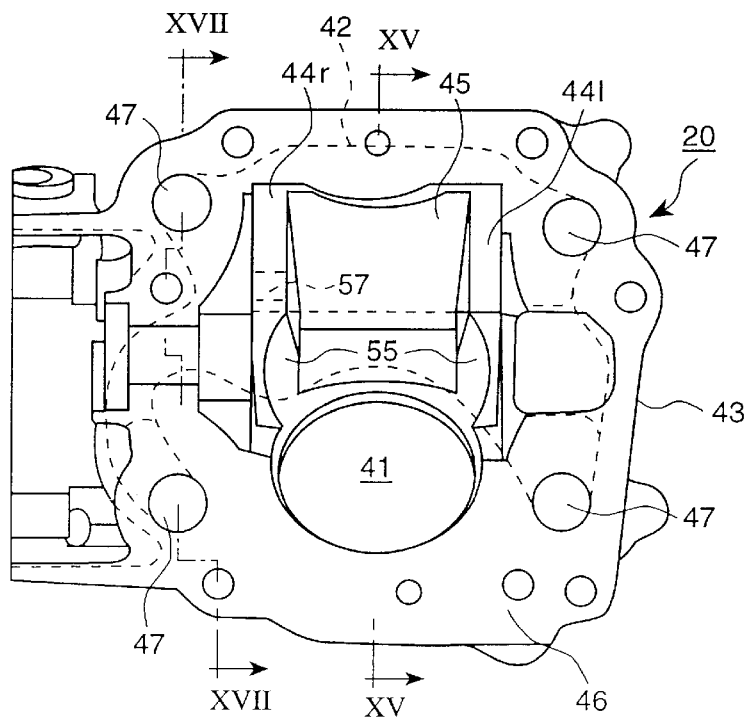
FIG. 11 is a view taken along line XI—XI of FIG. 9.
Figure 12:
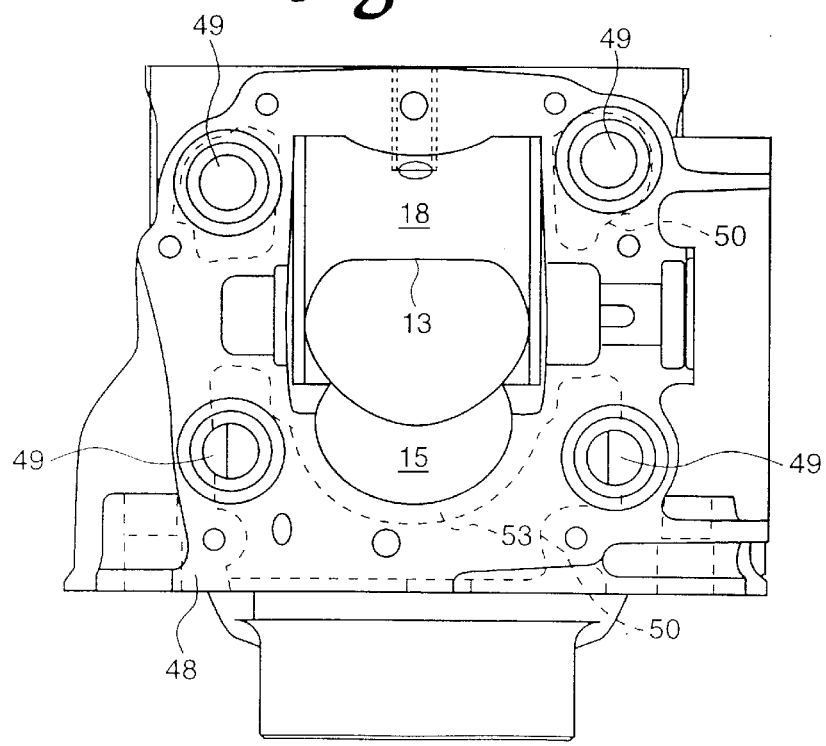
FIG. 12 is a view taken along line XII—XII of FIG. 9.
Figure 13:
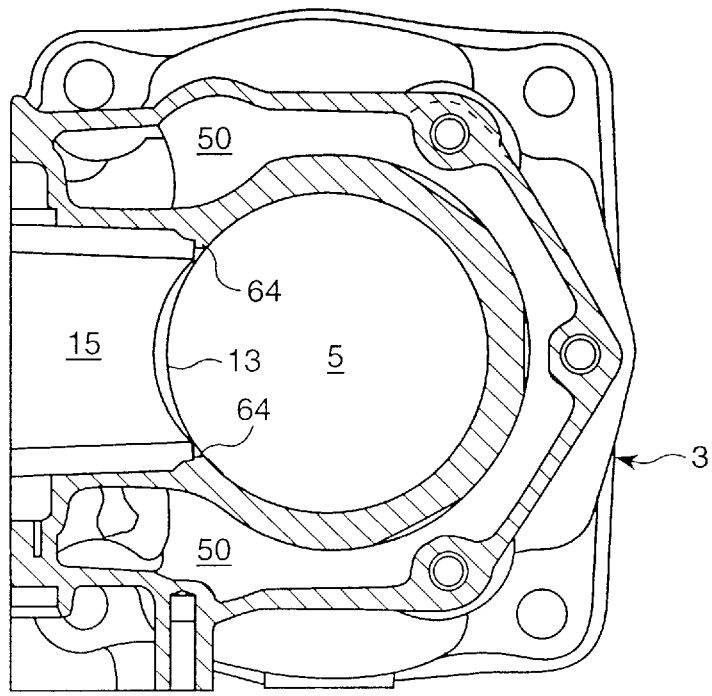
FIG. 13 is a transverse sectional plan view taken on line XIII—XIII of FIG. 9.
Figure 15:
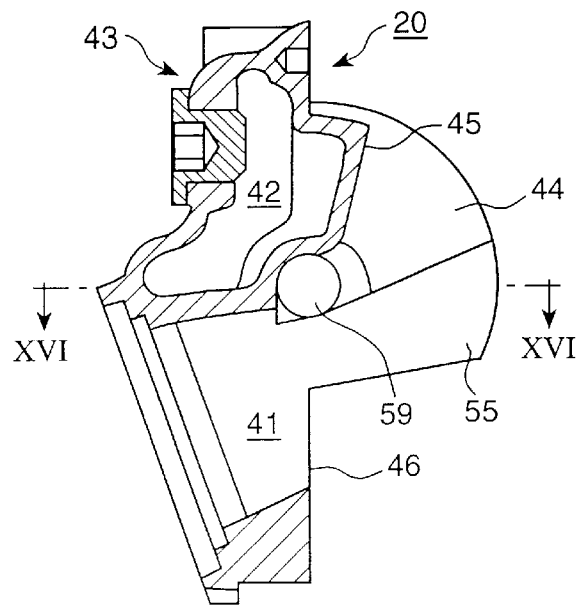
FIG. 15 is a vertical sectional side view taken on line XV—XV of FIG. 11.
Figure 16:
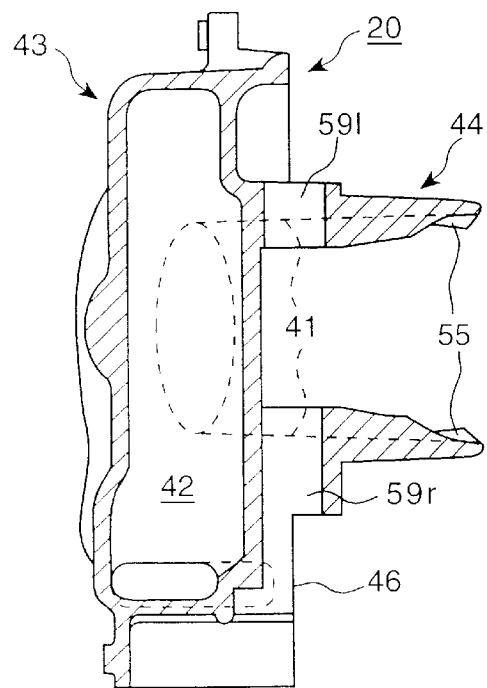
FIG. 16 is a transverse sectional plan view taken on line XVI—XVI of FIG. 15.
Figure 19:
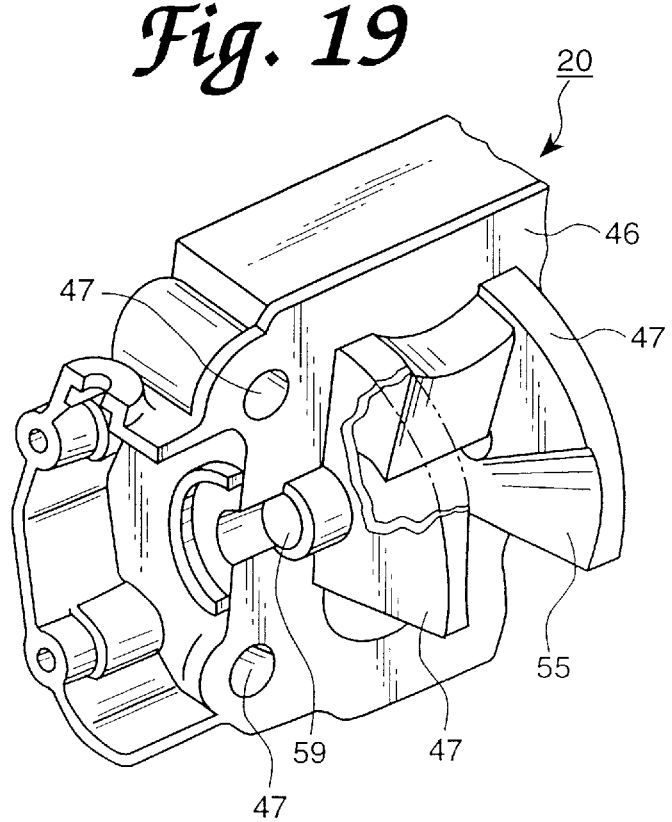
FIG. 19 is a perspective view of a lid member, with parts partially cutaway.

As shown in FIGS. 11, 15 and 19, the lid member 20 includes a downwardly extending exhaust passage 41 smoothly connected to a downwardly projecting portion of the exhaust passage 15 of the cylinder block 3. The lid member 20 is composed of a lid main body 43 in which a cooling water passage 42 is formed in such a manner so as to surround an upper half of the downwardly extending exhaust passage 41, and plate-like exhaust passage forming portions 44 each being formed in a fan shape capable of being loosely fitted in the containing recessed portion 18 of the cylinder block 3. As shown in FIG. 15, the lid main body 43 has, in an upper space surrounded by the exhaust passage forming portions 44, a fan-shaped projecting partitioning wall 45 having a center angle narrower than those of each exhaust passage forming portion 44 of the lid member 20 and each side wall 25 of the exhaust control valve 21 in a side view. The cooling water passage 42 extends into the projecting partitioning wall 45. As shown in FIGS. 11 and 12, four pieces (upper, lower, right, and left) of the cooling water communication ports 47 communicate with a cooling water passage 50 of the cylinder block 3 via cooling water communication ports 49 which are formed in a mating surface 48 of the cylinder block 3 and are formed in a mating surface 46 of the lid main body 43. A cooling water passage 51 communicates with the cooling water passage 50 and is also formed in the cylinder head 4.

Figure 6:
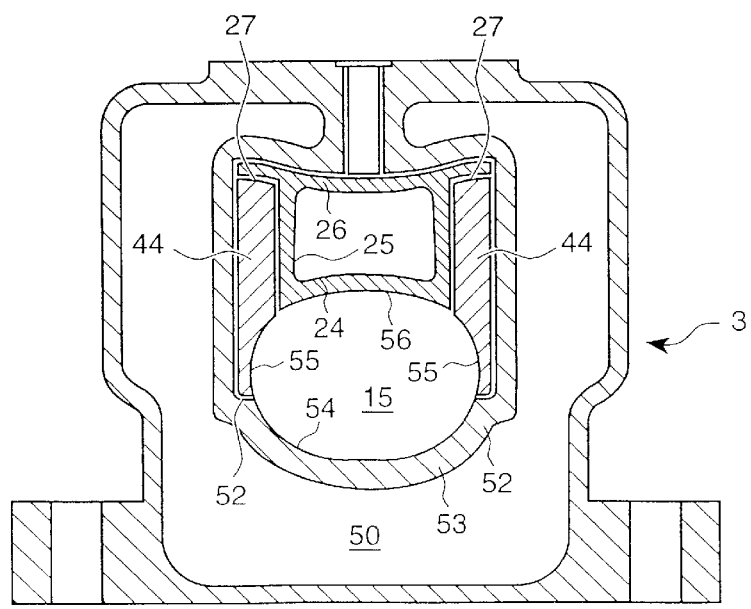
FIG. 6 is a partially vertical sectional front view taken on line VI—VI of FIG. 5.
Figure 8:
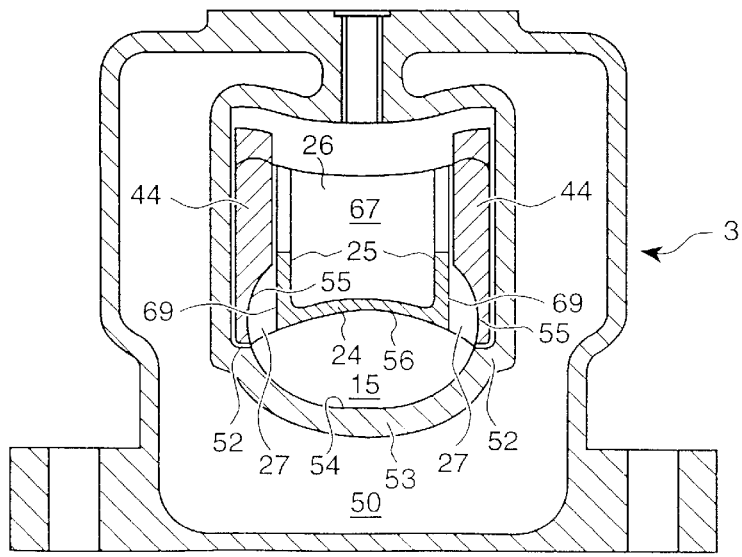
FIG. 8 is a partially vertical sectional view taken on line VIII—VIII of FIG. 7.
Figure 9:
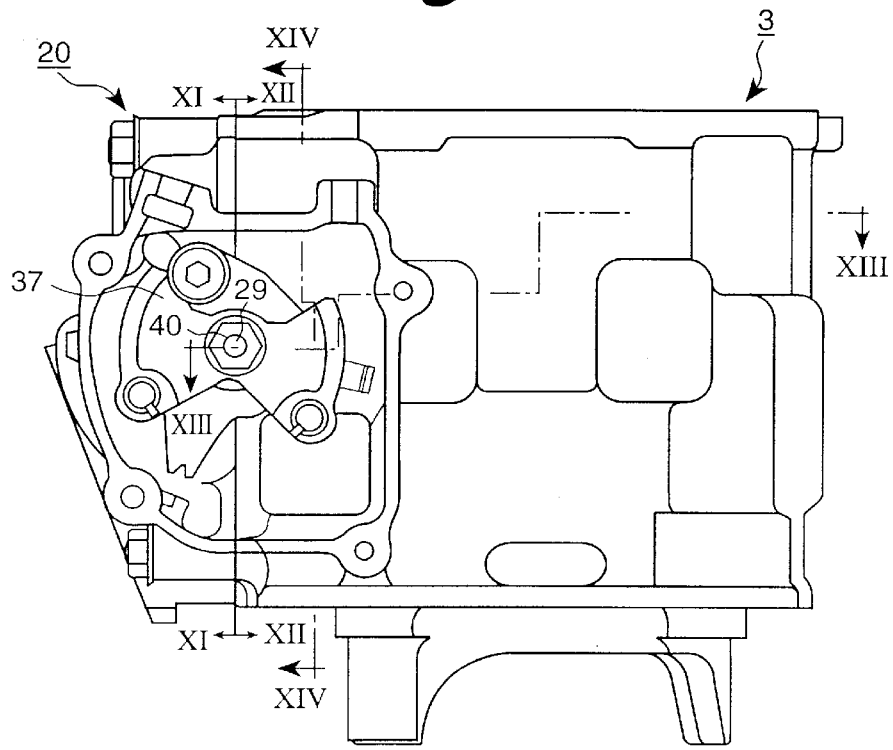
FIG. 9 is a side view of an essential portion showing a state in which a lid member is mounted on a cylinder block.
Figure 10:
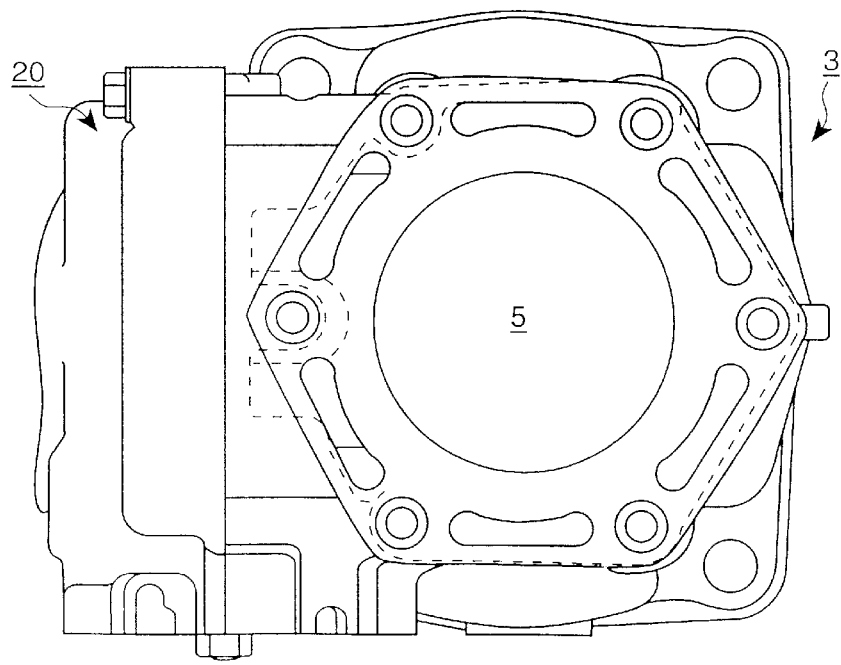
FIG. 10 is a plan view of FIG. 9.
Figure 14:
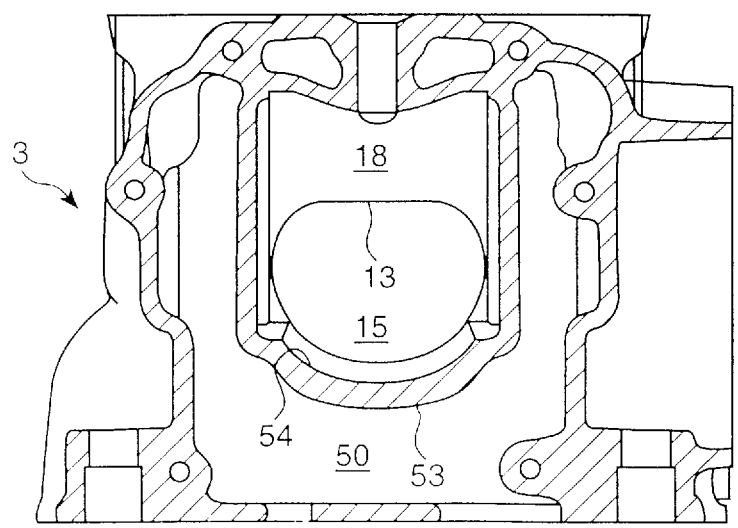
FIG. 14 is a vertical sectional front view taken on line XIV—XIV of FIG. 9.

As shown in FIGS. 6, 8 and 14, the exhaust passage 15 formed in the cylinder block 3 is surrounded by a passage wall 53. The passage wall 53 is partially curved in an elliptic shape in a transverse cross section extending downwardly from the stepped portions 52 brought in contact with lower surfaces of the exhaust passage forming portions 44 of the lid member 20. Consequently, the exhaust passage 15 which is formed in an elliptic shape with a major axis in the right and left (horizontal) direction is formed with an inner curving surface 54 of the passage wall 53, inner exhaust passage curving surfaces 55 of the exhaust passage forming portions 44, and a lower surface 56 of the bottom wall 24 of the exhaust control valve 21.

Figure 17:
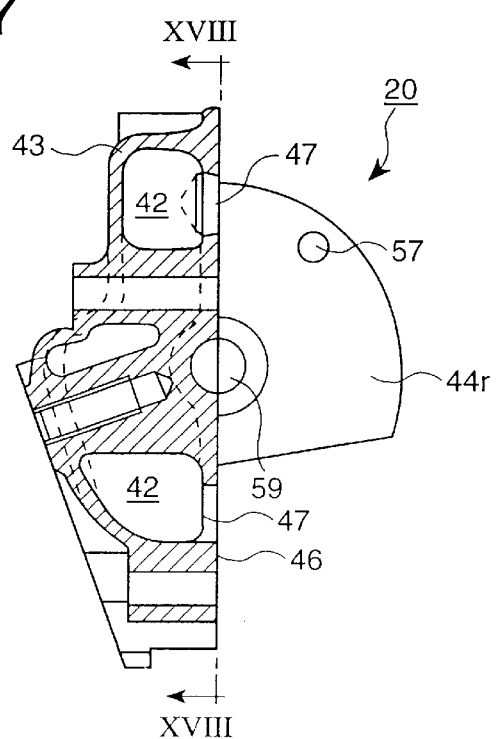
FIG. 17 is a vertical sectional view taken on line XVII—XVII of FIG. 11.
Figure 18:
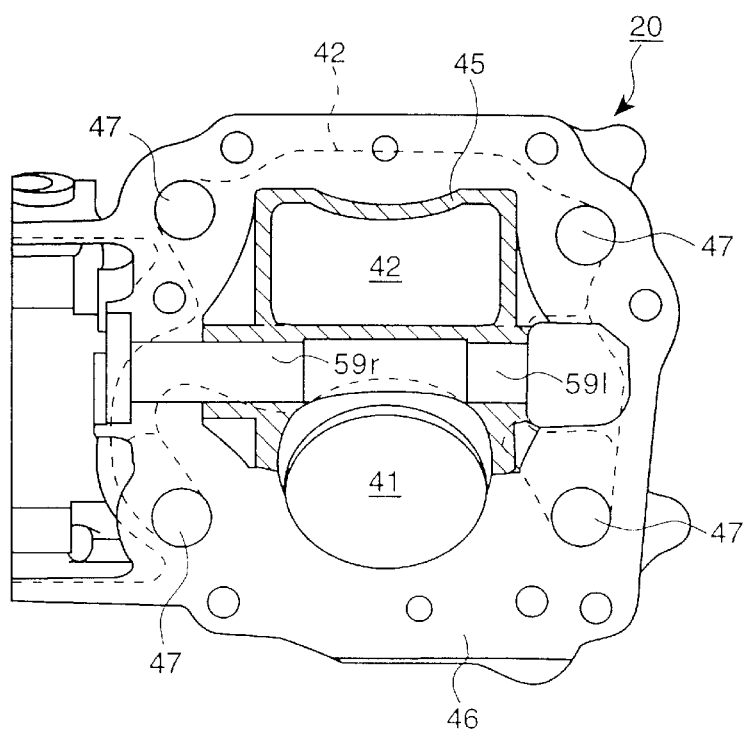
FIG. 18 is a vertical sectional view taken on line XVIII—XVIII of FIG. 17.
Figure 20:
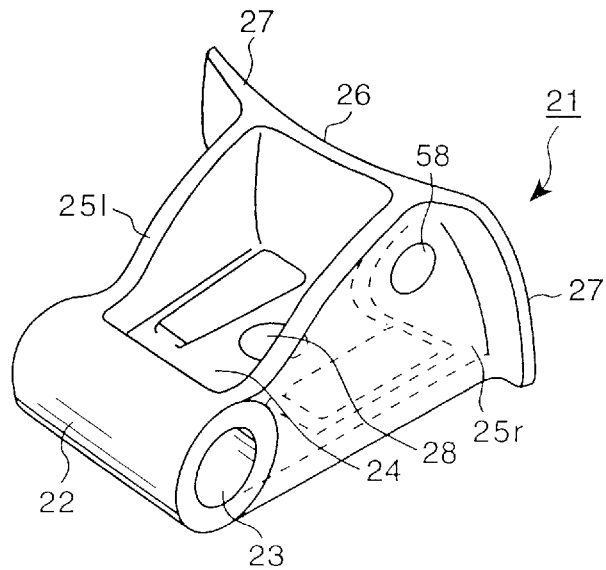
FIG. 20 is a perspective view of an exhaust control valve.

A pair of the right and left exhaust passage forming portions 44l, 44r are provided, as shown in FIGS. 11 and 17. The right side exhaust passage forming portion 44r is provided as seen from the lid member 20 to the cylinder block 3 has a positioning through-hole 57. As shown in FIGS. 20, 21 and 23, the right side wall 25r of the exhaust control valve 21 has a positioning blind hole 58. Pivot supporting holes 59 for pivotably supporting the valve driving shaft 29 are formed in both the lid main body 43 and the exhaust passage forming portions 44 of the lid member 20 in such a manner so as to be positioned at the center of the fan shape of each of the exhaust passage forming portions 44 (see FIGS. 15 to 18). After the collar 35 is fitted in the left pivotably supporting hole 59l, the exhaust control valve 21 is disposed between a pair of the right and left exhaust passage forming portions 44r and 44l and a positioning rod (not shown) is inserted in the positioning through-hole 57 of the exhaust passage forming portion 44r and in the side wall 25r of the exhaust control valve 21 to thus position the exhaust control valve 21. Then, in a state in which the center of the pivot supporting holes 59 is aligned with the center of the spline hole 23 of the exhaust control valve 21, the valve driving shaft 29 is inserted from the right pivot supporting hole 59 into the spline hole 23 and collar 35, followed by screwing the nut 36 with the small diameter portion 31 of the valve driving shaft 29, to thereby mount the exhaust control valve 21 on the valve driving shaft 29 in such a manner so as to be vertically rockably supported by the exhaust passage forming portions 44 of the lid member 20 via the valve driving shaft 29.

Figure 3:
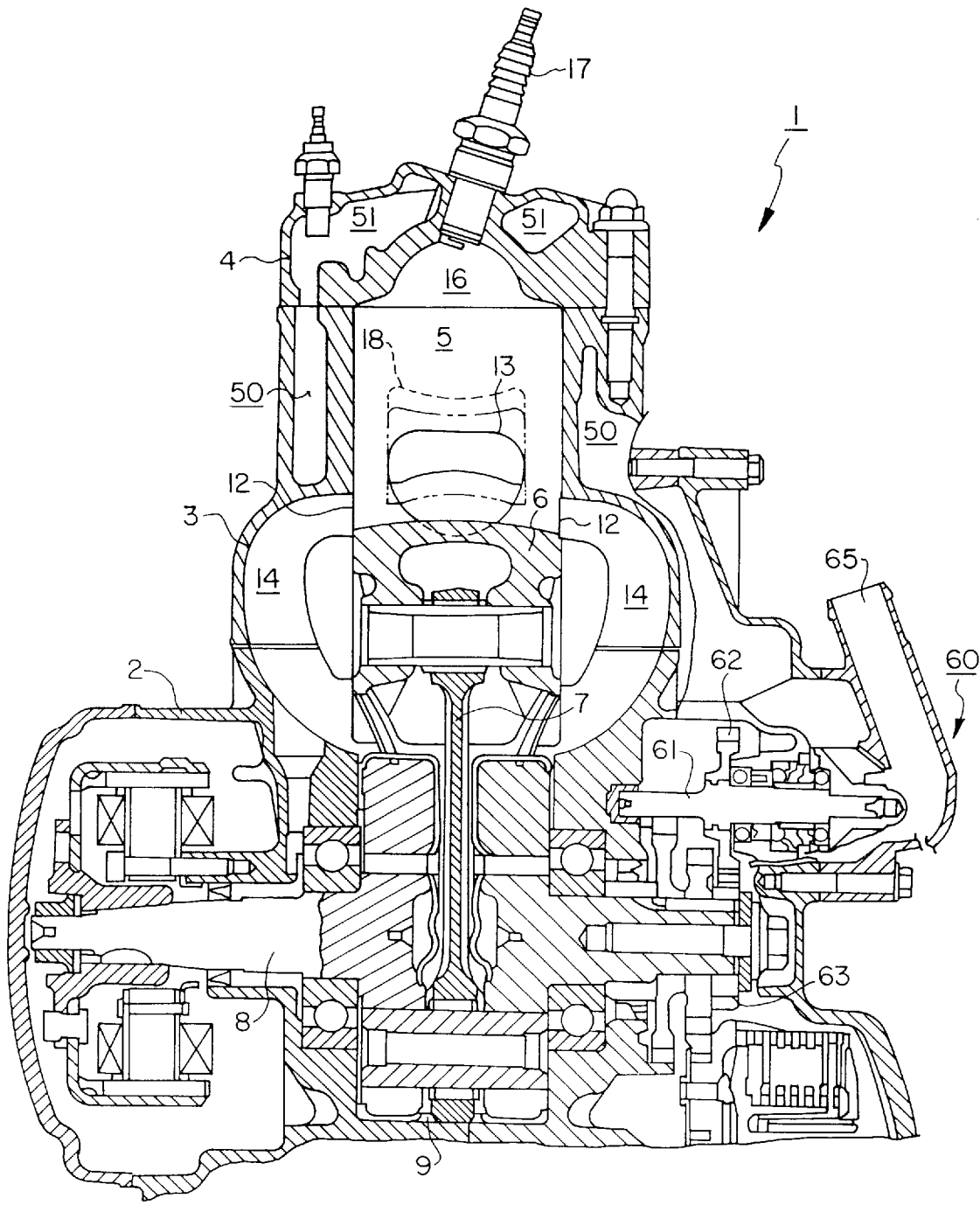
FIG. 3 is a vertical sectional front view taken on line III—III of FIG. 2.

As shown in FIG. 3, a driven gear 62 fitted integrally with a rotating shaft 61 of a cooling water pump 60 meshes with a drive gear 63 integrated with the crank shaft 8. When the crank shaft 8 is rotated, the cooling water pump 60 is rotated. Thus, a cooling water discharged from the cooling water pump 60 flows in the cooling water passage 50 of the cylinder block 3. Part of the cooling water flows in the cooling water passage 42 through the lower openings 49, 47, being returned into the cooling water passage 50 through the upper openings 49, 47, and it flows in the cooling water passage 51 of the cylinder head 4, to thereby cool the cylinder block 3, cylinder head 4 and the lid member 20. In addition, the cooling water discharged from a cooling water discharge port 64 of the cooling water passage 51 of the cylinder head 4 is fed to a radiator (not shown), being cooled by the radiator, and is returned into a suction port 65 of the cooling water pump 60.

The pulley 37 is connected to a drive pulley of a servo-motor (not shown) via a cable 66. The rotation of the servo-motor is controlled by a control signal of a CPU operated to receive input signals regarding a rotational speed of the engine 1, an opening degree of a throttle valve, and an intake pressure and calculates the rotational speed of the servo-motor on the basis of a specific control map. In a low speed operational state of the engine 1, the exhaust control valve 21 is rocked downwardly by the servo-motor, and in a high speed operational state of the engine 1, the exhaust control valve 21 is rocked upwardly by the servo-motor.

Figure 7:
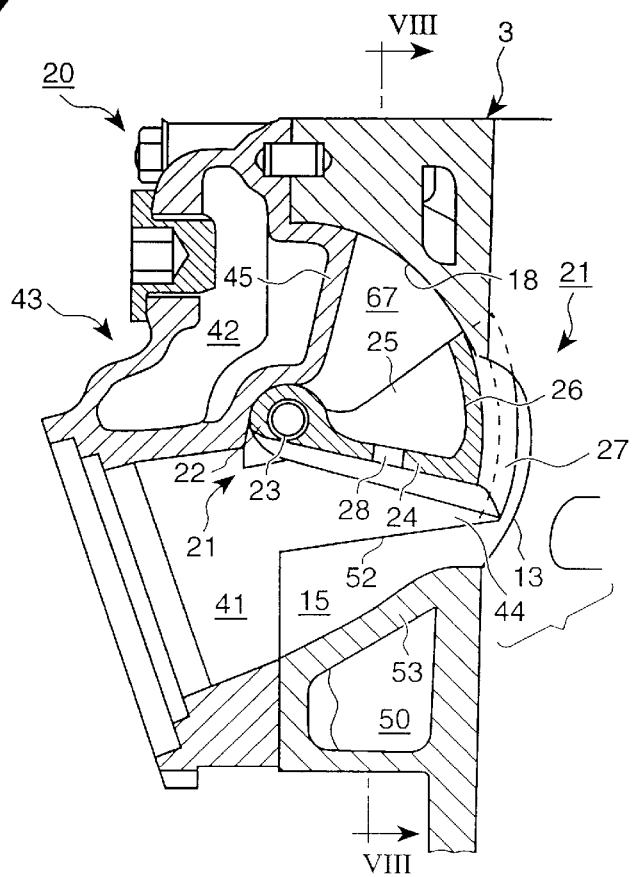
FIG. 7 is a partially vertical sectional side view, similar to FIG. 5, showing a state in which the exhaust control valve is rocked upwardly.

According to the embodiment having the above configuration shown in FIGS. 1 to 23, the exhaust control valve 21 is rocked downwardly as shown in FIGS. 7 and 8 in a low speed operational state, for example, upon an idling operation, with a result that the starting timing of blocking the exhaust port 13 at the up stroke of the piston 6 is advanced and the starting timing of opening the exhaust port 13 at the down stroke of the piston 6 is retarded. As a result, the compression ratio is increased and the volume of a space portion 67 surrounded by the containing recessed portion 18 and the exhaust control valve 21 is enlarged.

In such a low speed operational state, by the increased volume of the space portion 67 communicated via the communication hole 28 to an exhaust system composed of the exhaust passage 15, downstream exhaust passage 41 and an exhaust pipe (not shown), the substantial length of the exhaust system is extended, so that a positive pressure reflection wave of the exhaust gas in the low speed operational state reaches the exhaust port 13 in a proper timing corresponding to the completion of the blocking of the exhaust port 13. As a result, the blowoff of new gas (unburnt gas) from the exhaust port 13 into the exhaust passage 15 and the downstream exhaust passage 41 can be prevented by such a positive pressure reflection wave and also the exhaust of the new gas is controlled, to thereby improve the charging efficiency in a low speed operational state, thus increasing the output and improving the fuel consumption.

Further, in a state in which the exhaust control valve is descended to the lower limit, a large amount of the burnt gas remains in the combustion chamber 16 and the combustion chamber 16 is kept at a high temperature. In addition, an actively thermal atmospheric combustion is performed near the top dead center by the increased compression ratio, thereby avoiding the significant reduction in output and preventing the amount of unburnt hydrocarbon in the exhaust gas from being increased.

Figure 5:
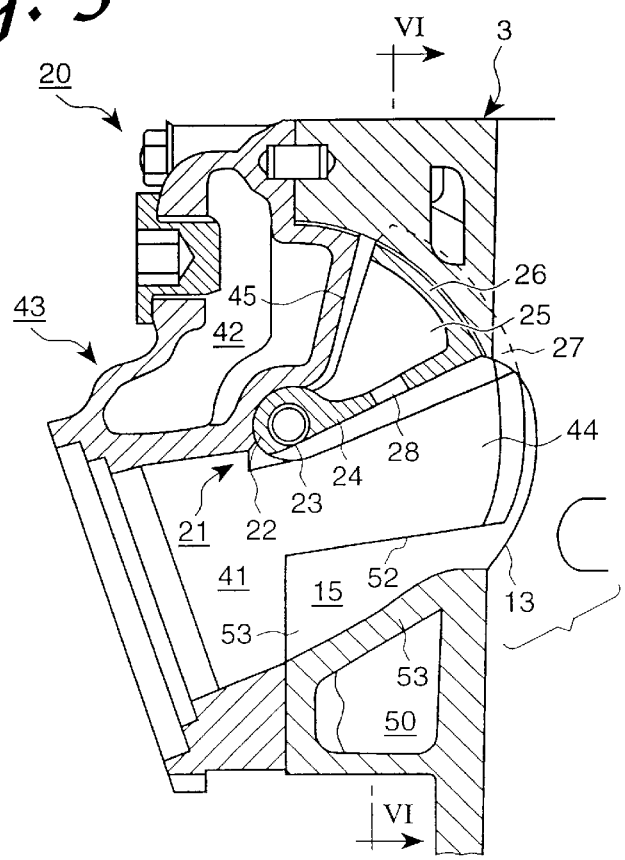
FIG. 5 is a partially vertical sectional side view taken along line V—V of FIG. 4.

As the crank shaft 8 is accelerated from a low speed operational state, the control exhaust valve is rocked upwardly as shown in FIGS. 5, 6, so that the starting timing of blocking the exhaust port 13 at the up stroke of the piston 6 is retarded while the starting timing of opening the exhaust port 13 at the down stroke of the piston 6 is advanced, and also the volume of the space portion 67, as illustrated in FIGS. 7 and 8, is reduced. Accordingly, it is possible to smoothly perform a large gas exchange and hence to achieve an exhaust pressure pulsation effect. Further, since the positive pressure reflection wave of the exhaust gas in a high speed operational state reaches the exhaust port 13 in a proper timing corresponding to the completion of the blocking of the exhaust port 13, it is possible to suppress the discharge of the new gas from the exhaust port 13 by the positive pressure reflection wave, and hence to increase the output while keeping a desirable fuel consumption.

The volume of the space portion 67 is continuously changed depending on the degree of vertical rocking of the exhaust control valve 21 and correspondingly the substantial length of the exhaust system is continuously changed, so that a high exhaust pulsation effect can be obtained in a wide range from a low speed operational region to a high speed operational region, differently from the related art spark ignition type two stroke internal combustion engine in which the substantial length of the exhaust system is changed only between large and small values.

In the lid member 20 including the downstream exhaust passage 41, the outer periphery of the downstream exhaust passage 41 is surrounded by the cooling water passage 42, so that the outer peripheral wall of the downstream exhaust passage 41 can be sufficiently cooled, and also the lid member 20 is substantially uniformly cooled to thereby prevent an occurrence of a large thermal strain in the lid member 20.

As shown in FIGS. 5 and 6, in a state in which the exhaust control valve 21 is rocked upwardly and the exhaust port 13 is fully-opened, the lower half of the exhaust gas discharged from the exhaust port 13 of the cylinder block 3 flows along the exhaust passage 15 of the cylinder block 3. As shown in FIG. 6, the upper half of the exhaust gas flows along the inner exhaust passage curving surfaces 55 of the exhaust passage forming portions 44 formed in a shape smoothly connected to the inner curving surface 54 of the exhaust passage 15 and along the lower surface of the bottom wall 24 of the exhaust control valve 21. Thus, the lower half and the upper half of the exhaust gas are smoothly collected in the downstream exhaust passage 41 without a large disturbance, to thereby smoothly carry out the gas exchange in the combustion chamber 16.

Further, as shown in FIGS. 7 and 8, in a state in which the exhaust control valve 21 is rocked downwardly and the exhaust port 13 is restricted, the projecting portions 27 project from both of the sides of the control wall 26 of the exhaust control valve 21 and are brought in close-contact with the leading end surfaces of the exhaust passage forming portions 44 to cover from the front side the inner exhaust passage curving surfaces 55 of the exhaust passage forming portions 44. The lower surface 56 of the bottom wall 24 of the exhaust control valve 21 is opposed to the inner curving surface 54 of the passage wall 53 of the exhaust passage 15, to form the upper surface of the flow passage, so that the exhaust gas smoothly flows down into the downwardly extending exhaust passage 41 without a large disturbance, to thereby smoothly carry out the gas exchange in a low speed rotational state.

When the exhaust control valve 21 is rocked downwardly and the exhaust port 13 is restricted, the upper edge of the piston 6 is positioned between the upper edge of the exhaust port 13 and the lower surface of the bottom wall 24 of the exhaust control valve 21, and in such a state, as shown in FIG. 8, burnt gas in the cylinder hole 5 is prevented from flowing into gaps between the inner exhaust passage curving surfaces 55 of the exhaust passage forming portions 44 and the outer surfaces 69 of the side walls 25 of the exhaust control valve 21 by the projecting portions 27 projecting from both of the sides of the control wall 26 of the exhaust control valve 21 and projecting portions 68 projecting in the center direction from the edges of the projecting portions 27 on both of the sides of the exhaust port 13 of the cylinder block 3 (see FIG. 4), to prevent the leakage of the burnt gas from the cylinder hole 5 into the downstream exhaust passage 41, thereby increasing the scavenging effect and the charging effect. This makes it possible to improve the output and efficiency of the spark ignition type two stroke internal combustion engine 1.

Further, as shown in FIG. 4, since the exhaust passage forming portions 44 are provided on the lid member 20, the exhaust control valve 21 having the projecting portions 27 can be inserted in the exhaust passage 15 without interference of the projecting portions 68 in the exhaust port 13 of the cylinder block 3.

As illustrated in FIGS. 5, 6 and 11, the lower surfaces of the exhaust passage forming portions 44 of the lid member 20 are each brought into contact with the stepped portions 52 at the upper edge of the passage wall 53 constituting the exhaust passage 15 of the cylinder block 3, most of the dead weight of the lid member 20 is supported by the stepped portions 52 of the cylinder block 3. If a stopper pin is not provided, the lid member 20 can be accurately, rigidly fixed on the cylinder block 3 at a desired position.

Figure 28:
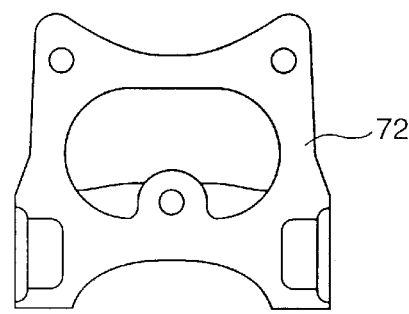
FIG. 28 is a rear view of the exhaust passage member shown in FIG. 26.
Figure 29:
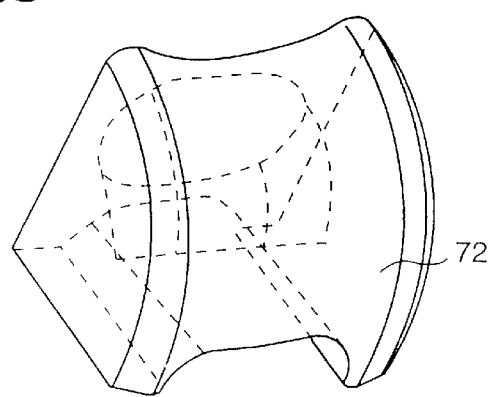
FIG. 29 is a perspective view of the exhaust passage member shown in FIG. 28.
Figure 30:
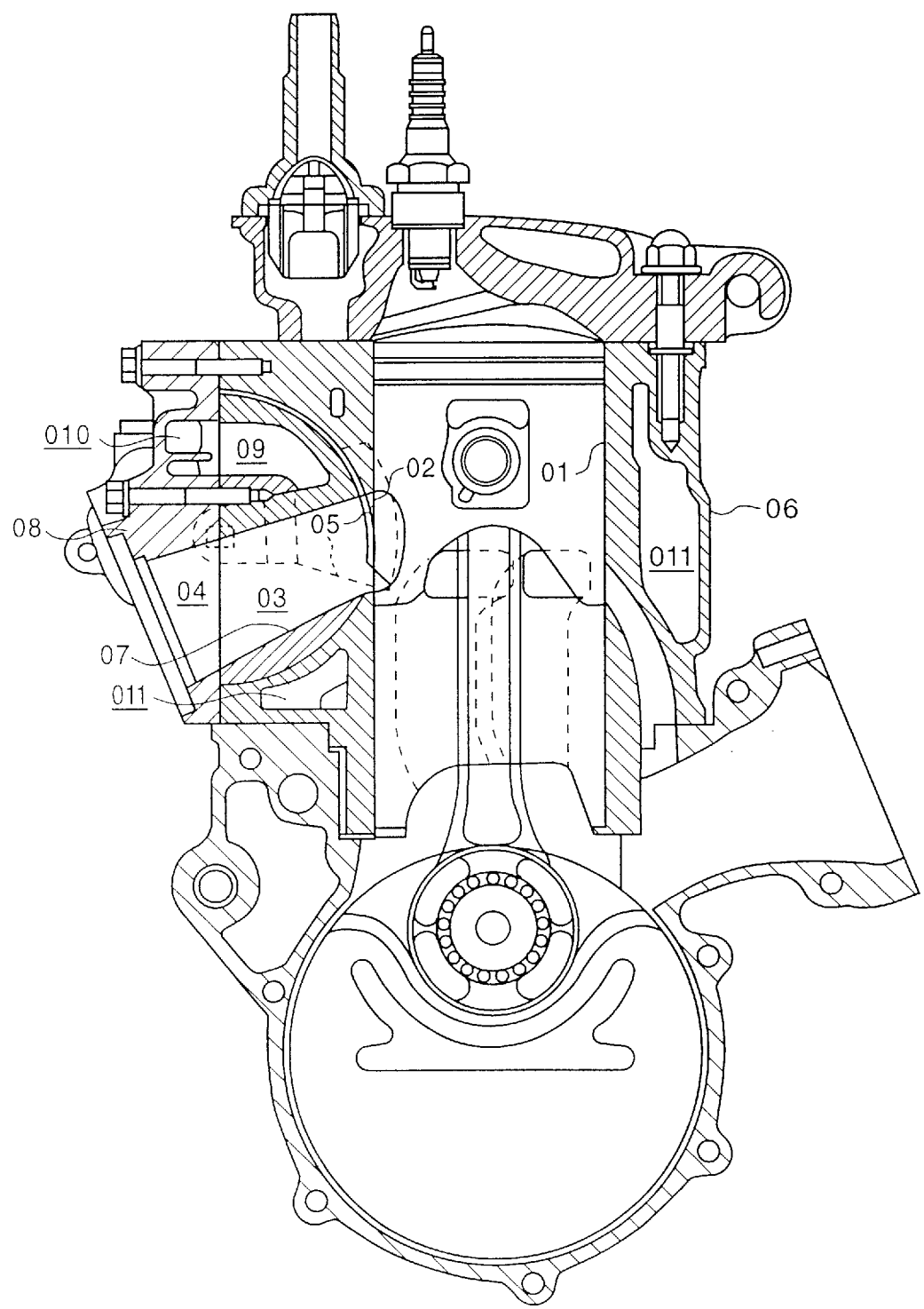
FIG. 30 is a vertical sectional side view of a related art spark ignition type two stroke internal combustion engine.
Figure 31:
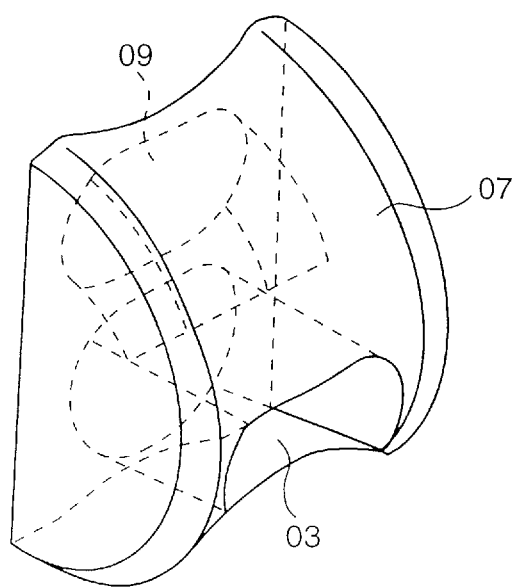
FIG. 31 is a perspective view of an exhaust passage member in the internal combustion engine shown in FIG. 30.

In the embodiment shown in FIGS. 1 to 23, the exhaust control valve 21 is formed substantially in a fan shape in a side view, and it is composed of the rotatably supporting portion 22, bottom wall 24, side walls 25 and control wall 26. However, a plate-like exhaust control valve 70 can be used as shown in FIGS. 24 to 29, which has a configuration similar to that of the related art exhaust control valve 05 (see FIG. 30) in which the lower half of the exhaust passage member 07 is cut off. In such an exhaust control valve 70, as shown in FIGS. 28 and 29, an exhaust passage 72 to be mounted on a lid member 71 may be formed and a passage wall 73 corresponding to the cut-off lower half of the exhaust passage member 07 may be formed in a cylinder block 74. This passage wall 73 is prevented from being heated at a high temperature because it is directly cooled by the cooling water passage 50.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An exhaust controller for a spark ignition type two stroke internal combustion engine comprising:
   an exhaust passage in communication with a cylinder hole via an exhaust port formed in a cylinder block, the exhaust passage including a cylinder head side portion and a crank case side portion;
   an exhaust control valve mounted for reciprocating motion to be movable along said exhaust port along a center line direction of said cylinder hole for blocking at least said cylinder head side portion of said exhaust port;
   the cylinder head side portion of said exhaust passage including an outer peripheral portion, an upstream portion of said outer peripheral portion smoothly connected to said exhaust port and formed by a lid member which closes said exhaust control valve;
   the crank case side portion of said exhaust passage including an outer peripheral portion, an upstream portion of said outer peripheral portion smoothly connected to said exhaust port and being formed by the cylinder block;
   said cylinder head side outer peripheral portion of said exhaust passage being cooled by a cooling water passage disposed adjacent to a cylinder head, said cooling water passage being formed in said lid member, and said crank case side outer peripheral portion of said exhaust passage being directly cooled by a cylinder block cooling water passage disposed adjacent to the crank case, said cylinder block cooling water passage being formed in said cylinder block.

2. The exhaust controller for a spark ignition type two stroke internal combustion engine according to claim 1, wherein said cylinder block cooling water passage disposed adjacent to the crank case is communicated through cooling water openings to said cooling water passage disposed adjacent to a cylinder head which is provided in said lid member, and said cooling water openings are formed in mating faces of said cylinder block and said lid member, said mating faces extending along the center line direction of said cylinder hole.

3. The exhaust controller for a spark ignition type internal combustion engine according to claim 1, wherein said exhaust control valve is mounted to be rockable around the cylinder head side of a downstream portion of said exhaust passage.

4. The exhaust controller for a spark ignition type internal combustion engine according to claim 2, wherein said exhaust control valve is mounted to be rockable around the cylinder head side of a downstream portion of said exhaust passage.

5. The exhaust controller for a spark ignition type two stroke inner combustion engine according to claim 3, wherein said portion of said exhaust passage formed by said lid member is brought into contact with said portion of said exhaust passage formed by said cylinder block.

6. The exhaust controller for a spark ignition type two stroke inner combustion engine according to claim 4, wherein said portion of said exhaust passage formed by said lid member is brought into contact with said portion of said exhaust passage formed by said cylinder block.

7. The exhaust controller for a spark ignition type two stroke internal combustion engine according to claim 5, wherein said portion of said exhaust passage formed by said lid member extends from said exhaust port to an exhaust pipe connection point downstream from said exhaust port.

8. The exhaust controller for a spark ignition type two stroke internal combustion engine according to claim 6, wherein said portion of said exhaust passage formed by said lid member extends from said exhaust port to an exhaust pipe connection point downstream from said exhaust port.

9. The exhaust controller for a spark ignition type two stroke internal combustion engine according to claim 7, wherein said lid member forms a downstream outer peripheral portion of said exhaust passage on the cylinder head side portion and the crank case side portion thereof, further wherein said portion of said exhaust passage formed by said cylinder block extends form said exhaust port to said lid member.

10. The exhaust controller for a spark ignition type two stroke internal combustion engine according to claim 8, wherein said lid member forms a downstream outer peripheral portion of said exhaust passage on the cylinder head side portion and the crank case side portion thereof, further wherein said portion of said exhaust passage formed by said cylinder block extends form said exhaust port to said lid member.

11. The exhaust controller for a spark ignition type two stroke internal combustion engine according to claim 3, wherein said exhaust control valve includes a bottom wall forming a portion of said exhaust passage, said bottom wall extending from said exhaust port to the portion of said control valve which is mounted to be rockable.

12. The exhaust controller for a spark ignition type two stroke internal combustion engine according to claim 4, wherein said exhaust control valve includes a bottom wall forming a portion of said exhaust passage, said bottom wall extending from said exhaust port to the portion of said control valve which is mounted to be rockable.

13. An exhaust controller for a spark ignition type two stroke internal combustion engine comprising:

an exhaust passage in communication with a cylinder hole via an exhaust port formed in a cylinder block, the exhaust passage including a cylinder head side portion and a crank case side portion;

an exhaust control valve mounted for reciprocating motion to be movable along said exhaust port along a center line direction of said cylinder hole for blocking at least said cylinder head side portion of said exhaust port;

the cylinder head side portion of said exhaust passage including an outer peripheral portion, an upstream portion of said outer peripheral portion smoothly connected to said exhaust port and formed by a lid member having an exhaust passage member provided thereon and said exhaust control valve; and the crank case side portion of said exhaust passage including an outer peripheral portion, an upstream portion of said outer peripheral portion being formed by the cylinder block;

said cylinder head side outer peripheral portion of said exhaust passage being cooled by a cooling water passage disposed adjacent to a cylinder head, said cooling water passage being formed in said exhaust passage member of said lid member, and said crank case side outer peripheral portion of said exhaust passage being directly cooled by a cylinder block cooling water passage disposed adjacent to the crank case, said cylinder block cooling water passage being formed in said cylinder block.

14. The exhaust controller for a spark ignition type two stroke internal combustion engine according to claim 13, wherein said cylinder block cooling water passage disposed adjacent to the crank case is communicated through cooling water openings to said cooling water passage disposed adjacent to a cylinder head which is provided in said lid member, and said cooling water openings are formed in mating faces of said cylinder block and said lid member, said mating faces extending along the center line direction of said cylinder hole.

15. The exhaust controller for a spark ignition type internal combustion engine according to claim 13, wherein said exhaust control valve is mounted to be rockable around a cylinder head side of a downstream portion of said exhaust passage.

16. The exhaust controller for a spark ignition type internal combustion engine according to claim 14, wherein said exhaust control valve is mounted to be rockable around a cylinder head side of a downstream portion of said exhaust passage.

17. The exhaust controller for a spark ignition type two stroke inner combustion engine according to claim 15, wherein said portion of said exhaust passage formed by said exhaust passage member of said lid member is brought into contact with said portion of said exhaust passage formed by said cylinder block.

18. The exhaust controller for a spark ignition type two stroke inner combustion engine according to claim 16, wherein said portion of said exhaust passage formed by said exhaust passage member of said lid member is brought into contact with said portion of said exhaust passage formed by said cylinder block.

19. The exhaust controller for a spark ignition type two stroke internal combustion engine according to claim 17, wherein said exhaust control valve is rockably supported on said exhaust passage member of said lid member.

20. The exhaust controller for a spark ignition type two stroke internal combustion engine according to claim 17, wherein said exhaust passage member of said lid member is disposed on each side of said exhaust control valve.

21. The exhaust controller for a spark ignition type two stroke internal combustion engine according to claim 19, wherein said exhaust passage member of said lid member is disposed on each side of said exhaust control valve.

* * * * *